May 5, 1925.

F. X. LAUTERBUR ET AL 1,536,224

PROCESS OF TREATING DOUGH

Filed Jan. 15, 1923  3 Sheets-Sheet 1

INVENTORS:
Frank X. Lauterbur,
Edward J. Lauterbur.
BY
Allen + Allen
ATTORNEYS.

Patented May 5, 1925.

1,536,224

UNITED STATES PATENT OFFICE.

FRANK X. LAUTERBUR AND EDWARD J. LAUTERBUR, OF SIDNEY, OHIO.

PROCESS OF TREATING DOUGH.

Application filed January 15, 1923. Serial No. 612,671.

*To all whom it may concern:*

Be it known that FRANK X. LAUTERBUR and EDWARD J. LAUTERBUR, citizens of the United States, residing at Sidney, in the county of Shelby and State of Ohio, have invented certain new and useful Improvements in Processes of Treating Dough, of which the following is a specification.

Our invention relates to a process of treating dough to form the same into shapes suitable for making loaves of bread or for making rolls or the like.

There are many types of dough used in bakeries for making bread and in all of them gases are present in various quantities when baking is begun. The ideal loaf is one in which these gases are equally distributed thruout the loaf, without causing over-expulsion of the gases.

Our invention applies to a process of making up the various forms of dough in which precaution is taken to prevent this over-expulsion of the gases, held within the doughy mass. In the forming of all loaves of bread and in particular, the formation of long thin loaves or long thin rolls there is considerable difficulty in using a machine operation, since the dough when it is not injured by pressing out too large a portion of the gases tends to return to its original shape after being formed in the rolling and kneading process. Thus our invention has as one of its objects the working of a mass of dough from a coil into a long thin body from which its elasticity will not cause it to return, and doing this without forcing out sufficient of the gases to injure the dough. In the formation of most pieces of dough by mechanical devices, from a lump of properly conditioned dough, the first operation consists in rolling the dough between two forming rolls which forces out some of the gases. This acts as a so called "break". From these rolls the dough is formed into a coil of a predetermined mass dependent upon the nature of the article to be formed.

In the method of treatment of our invention, the next step is to roll the coil so formed while at the same time imparting a kneading action. This mechanical treatment is usually performed by carrying the dough along on a conveyor which travels over a transversely corrugated or wavy surface, the dough being pressed from above by a board or the like, known as a pressure board.

In United States Letters Patent, No. 1,167,187 dated January 4th, 1916 is described a machine for treating dough in the manner above mentioned and the steps are substantially those of making a sheet of a measured mass of dough forming this mass into a coil and handling the coil on a conveyor between a transversely corrugated and a plain surface and at the same time effecting a rolling action thereof.

Up to certain limits this process of treating dough, to form and condition pieces ready for making them into loaves is highly satisfactory and results in a loaf in which the gases are equally and thoroly distributed thruout its entire length. This produces a loaf of the very highest grade. The nature of the corrugation or wavy surfaces is of importance and the amount of pressure applied for a given size of coils of dough is of importance, both the nature of corrugation and the amount of pressure being capable of pre-determination.

The limitations in the process above outlined come when it is desired to extend the loaf blank of dough in a longitudinal direction in the rolling and kneading portion of the mechanism.

The results of applying extra pressure to the pieces or coils of dough as they are being rolled and kneaded will be to extend them longitudinally (transversely of the pressure direction) but the tendency of the dough when in proper condition for making a good quality of bread is to return to its original longitudinal dimensions when the pressure is released from the piece.

The treatment of rolling a coil of dough between two surfaces and at the same time giving it a kneading action by forming waves in the surface, can be accomplished in a number of ways other than with the exact machine shown in the patent above referred to, and the mechanism there described is but one way of accomplishing the process.

In this invention the one set of mechanical means are shown and here again these are not set forth as the only possible way to mechanically accomplish the object in view.

We perform our process in that certain manner and by those certain steps to be hereinafter more specifically pointed and claimed.

Figure 1:
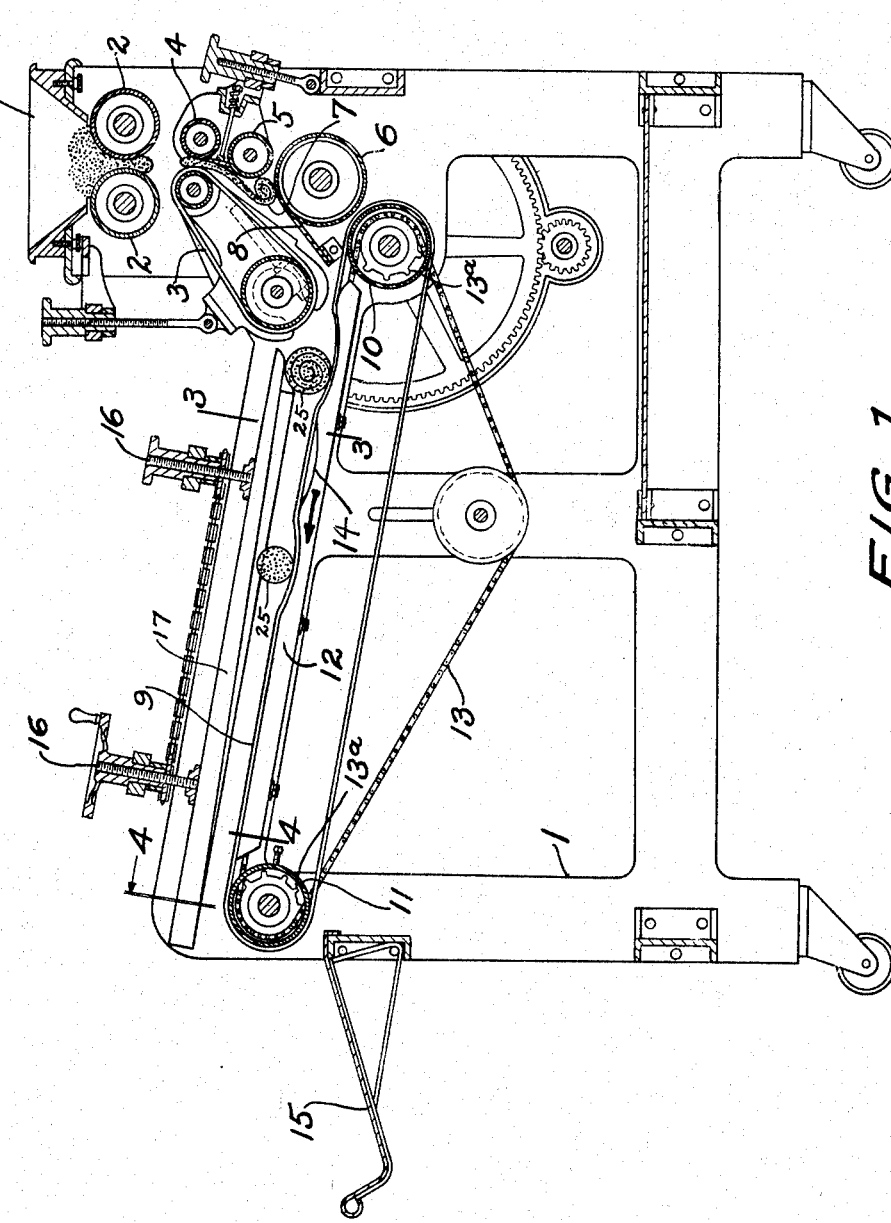
Figure 1 is a side elevation of a device which we have used with success in accomplishing our invention.
Figure 2:
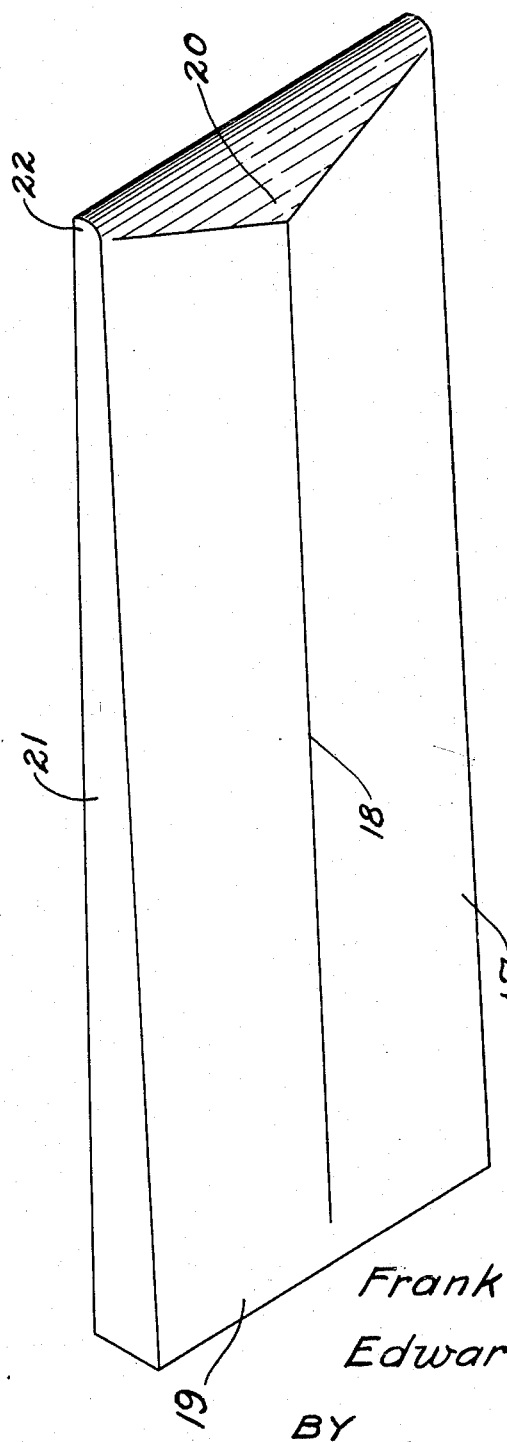
Figure 2 is a perspective view of a pressure board, used with the said device.
Figure 3:
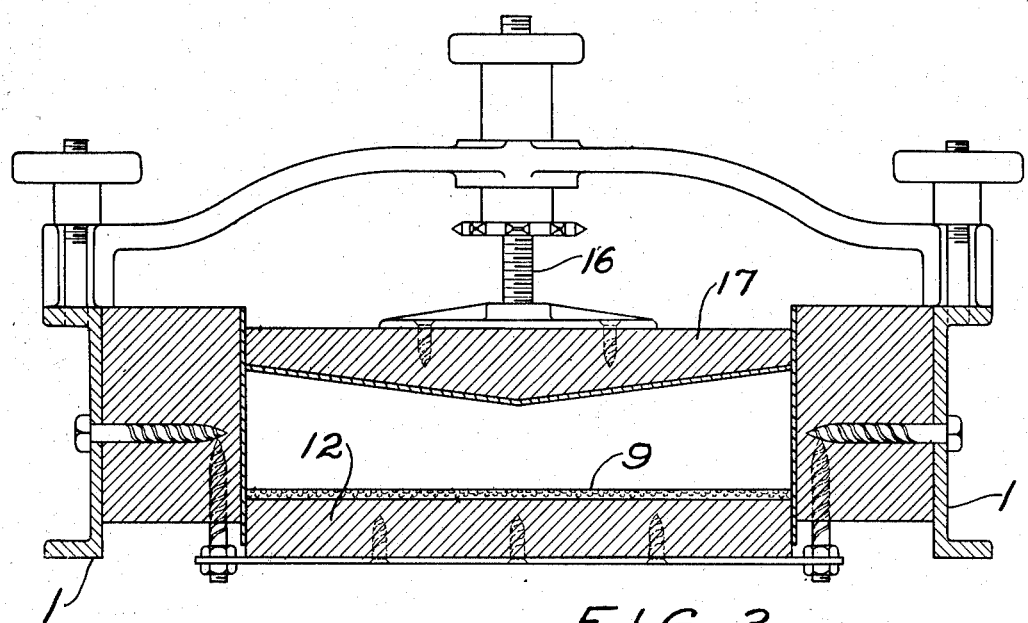
Figure 3 is a section on the line 3—3 of Figure 1.
Figure 4:
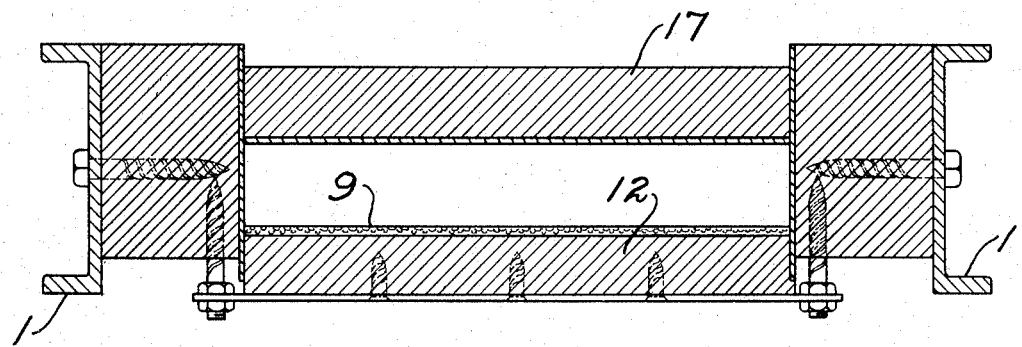
Figure 4 is a section on the line 4—4 of Figure 1.

The machine shown has a frame 1, in which are the various rolls, and driving mechanisms, and the dough is introduced into the hopper 1ª, from which it passes through the rolls 2, and between the belt 3, and roll 4. Between the conveyor 3 and the rolls 5 and 6, the dough is made into a coil, 7, which coil, when it is of the proper dimensions is carried down over the guide board 8, to the conveyor 9.

The conveyor 9, is in the form of a belt passing over the rolls 10 and 11 which are set at the two ends of a board 12. The conveyor is continuously driven from both ends by means of a sprocket chain 13 passing over sprockets 13ª, by power applied to the roller 10 where the dough first is deposited.

This board 12, is formed at its receiving end, with preferably four long waves 14, which as in the machine of the patent mentioned hitherto, gives the desired kneading action, and the belt travels in the direction indicated by an arrow (Fig. 1) from the receiving end to the delivery end thereof, where the formed and kneaded article is deposited on a tray 15.

Located above the conveyor 9 and held in adjustment by means of screws 16, is a pressure board 17 between which and a conveyor the dough must pass, and which accordingly imparts a rolling action to the dough since the board is stationary.

This board has a special formation which is carefully devised to fulfill the exact necessities of our process. Its thickness at the delivery end has a predetermined dimension, and then from a point fairly near the delivery end, the sides of the board are very gradually tapered away from the middle. This leaves a central line 18 of a uniform plane, from the full thickness portion 19 to a point 20 near the receiving end of the board. The sides 21, 21, of the board have a progressively increasing taper on both sides of the central line, extending from the full thickness portion to a line beginning at the point 20 and extending to the corners of the board at the receiving end.

The receiving end of the board is tapered down to a fairly thin receiving edge 22, preferably in an even curve. This forms what might be termed a receiving face that is symmetrical with the result that when a coil of dough, as indicated at 25, is carried along by the belt, that it is carried in a true crosswise direction with the ridge of the board striking it at the middle.

Following the course of a coil of dough that has been deposited on the conveyor, it will be observed that it is kneaded by an up and down wavy motion exerted toward the pressure board since the conveyor will be loose enough and is so driven that when the dough is upon it, it will follow the conformations of the underneath board or kneading board.

The action of the pressure board begins at the middle of the coil and tends to force the excess gases away from the center of the loaf while the ends of the coil are barely acted on at all at the start.

Instead of imprisoning the gases in the body of the loaf at the two sides or ends, the shape of the board results in the gases being gradually forced out towards these ends, during the rolling and kneading until at the delivery end of the machine, the relation between the pressure board and the kneading board is truly parallel. After the pressure has once been applied at any point on the loaf, it is not diminished until the loaf is discharged from the machine.

Thus it is impossible for the gases to return to their original position or to back up toward the center of the loaf.

This assures an even loaf and permits the forming of loaves of any desired length by eliminating the tendency of the dough to return to its original position.

Thus the process involves the rolling of a coil or mass of dough between two surfaces, one of which is at the start undulatory and the other acts to force the gases first away from the center and then gradually extend the application of force until the pressure is applied thruout the length of the coil without diminishing the pressure at any point after it has once been applied, the kneading and rolling continuing to act during a portion of the operation as desired.

This action gives the same results as if the coil were manipulated by hand. First, pressing the center of the coil by the two hands and then gradually bringing down the palms until both hands press evenly on the dough, working with the kneading and constantly spreading action until the desired length of the coil is obtained.

The point which distinguishes our process is the fact that the pressure on the dough is a centered one, gradually extending from the center of the loaf as the rolling and kneading starts until it finally extends clear across the article.

We find by proceeding as above stated that the loaf which is formed will be high grade in every way and will not revert to its original dimensions by contraction as is the case with all processes hitherto known.

The working in the manner noted works the gases thruout the loaf, distributing them in a manner which seems also to permanently alter the structure of the loaf and combined with the kneading action gives bread or rolls of a nature which has never been mechanically produced hitherto as far as we are advised. One way of expressing it is that while forming the loaf the dough is worked transversely and longitudinally from the center toward both ends.

In making up a mechanism to accomplish this process care should be taken to design the parts which come into contact with the dough in such a way as to give no violent action, as this will kill the dough. In a circular machine, the kneading action will probably have to be reduced over that shown in our drawings, and the tapering will have to be even more gradual than shown herein. If a flat lower board is used without kneading effect, and this is attempted all with the upper board, then care again will have to be exercised to get the gradual action desired. If a series of rollers is used, as in a roller table, with the spaces between the rolls giving a kneading effect here again experiment will be necessary to arrive at the desired action on the dough.

Having thus described our invention, which we claim as new and desire to secure by Letters Patent, is:—

1. A mechanical process for treating a mass of dough to form a loaf or roll shape, which consists substantially in mechanically rolling the mass, and simultaneously applying an intermittent undulatory pressure, this pressure being first directed mainly at the center of the mass and its effective area gradually extended at both sides from the center until the entire mass is subjected thereto, for the purpose described.

2. A mechanical process for treating a mass of dough to form a loaf or roll shape, which consists substantially in mechanically rolling the mass between surfaces, which simultaneously apply pressure lengthwise and transversely at the center and then gradually decreasing the central transverse pressure while maintaining the longitudinal pressure.

3. A mechanical process for treating a mass of dough which consists substantially in rolling and kneading the mass, under pressure, said pressure being applied first to the center of the mass transversely thereof, and then gradually extended at both sides from the center to the entire mass.

4. A mechanical process for treating a mass of dough which consists in passing the mass between two surfaces having such relative movement as to impart a rolling undulatory action to the mass, and at the same time applying pressure transversely at the center, beginning at the receiving point of the mass of dough, and gradually decreasing toward the delivery point on said mass.

5. A mechanical process for treating a mass of dough, which consists substantially in rolling the mass under pressure, said pressure being applied first at the center of the mass transversely thereof, and then gradually extended at both sides from the center to the entire mass.

6. A mechanical process for treating a mass of dough which consists substantially in rolling the mass of dough under pressure, said pressure being applied first at the center of the mass, and then gradually extended at both sides from the center to the entire mass, said pressure being at least in part an intermittently increasing and decreasing one, to impart a kneading action on the mass.

In testimony whereof we affix our signatures.

FRANK X. LAUTERBUR.
EDWARD J. LAUTERBUR.